July 6, 1954 W. D. CANNON ET AL 2,683,188

REPEATER SWITCHING APPARATUS

Filed Dec. 13, 1951 2 Sheets-Sheet 1

INVENTORS
W. D. CANNON
E. L. NEWELL
C. H. CRAMER

BY

ATTORNEY

REPEATER SWITCHING APPARATUS

INVENTORS
W. D. CANNON
E. L. NEWELL
C. H. CRAMER
BY
[signature]
ATTORNEY

UNITED STATES PATENT OFFICE 2,683,188

REPEATER SWITCHING APPARATUS

William D. Cannon, Metuchen, and Earl L. Newell, Chatham, N. J., and Clifford H. Cramer, Great Neck, N. Y., assignors to The Western Union Telegraph Company, New York, N. Y., a corporation of New York Application December 13, 1951, Serial No. 261,512

14 Claims. (Cl. 178—63)

Figure 1:
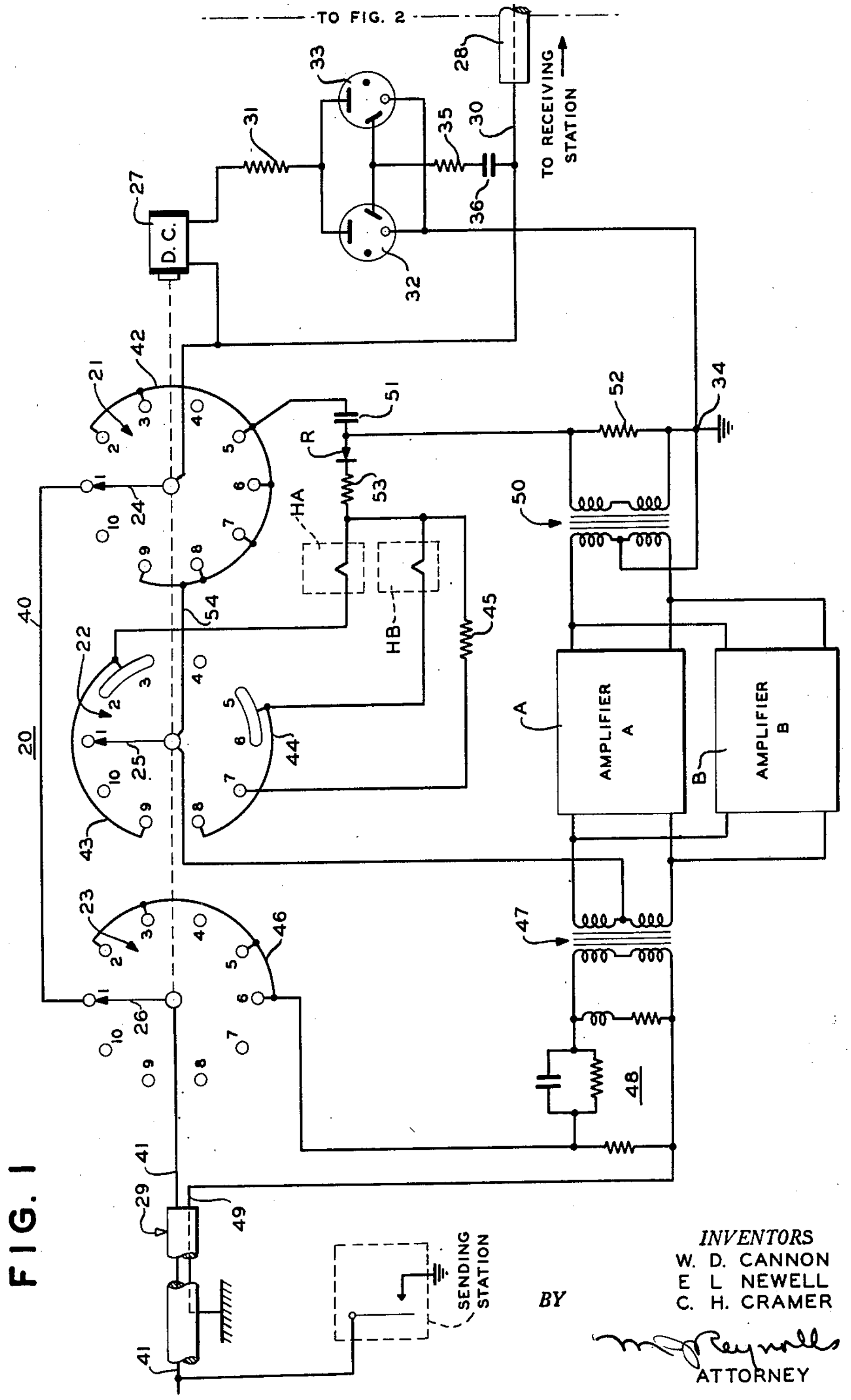

The present invention relates to electrical repeaters and more particularly to submersible electrical repeaters for use with submarine cables.

As indicated in the copending patent application of H. F. Wilder, Serial No. 229,146, filed May 31, 1951, now Patent No. 2,637,784, the speed, quality and reliability of service of a submarine cable can be greatly improved through the use of a repeating amplifier intermediate the sending and receiving terminals. The cost of raising and repairing a submerged repeater is very high, so that it is desirable that such a repeater have as long a life as possible. The life of a submerged repeater can be greatly extended through the use of high quality components and, in particular, long like tubes. However, since latent defects in tubes and other circuit components can not always be detected in advance, it is desirable that a submerged repeater be supplied with spare components and that means controllable from a short terminal be provided for switching spare components into service.

When a submerged repeater is incorporated in a submarine cable circuit, it is desirable that various tests, both with and without the repeater in the circuit, be available properly to maintain the submarine cable circuit. For instance, for locating cable faults or for operating the cable in a reverse direction, the repeating amplifier should be switched out of the cable circuit. The various test and operating conditions require switching apparatus located at the repeater and controllable from a shore station. When a single conductor is used for switching and signaling, it is important that the switching apparatus shunted across the signaling circuit appear as substantially an open circuit at signaling frequencies.

Accordingly, it is an object of the invention to provide novel and improved switching and control apparatus suitable for use with a submersible repeater in a submarine cable circuit.

More specifically, it is an object of the invention to provide switching apparatus in a submerged repeater circuit and control apparatus therefor at a shore station.

Another object of the invention is to provide reliable and positive acting switching and control apparatus for a submersible repeater.

Still another object of the invention is to provide switching apparatus for a submersible repeater interposed in a single conductor cable circuit and which will exhibit a substantially negligible influence on the signaling circuits.

Other and further objects of the invention will appear from the following description.

In accordance with the invention, these objects are achieved by providing a submersible repeater, switching apparatus associated with the repeater for providing a plurality of testing and operating conditions in the submarine cable circuit, operating means for the switching apparatus and including a cold cathode tube arranged to permit operation of the operating means upon receipt of a direct current impulse having a polarity the reverse of the polarity of the amplifier operating potentials and shore station apparatus for controlling the repeater operating means.

Figure 2:
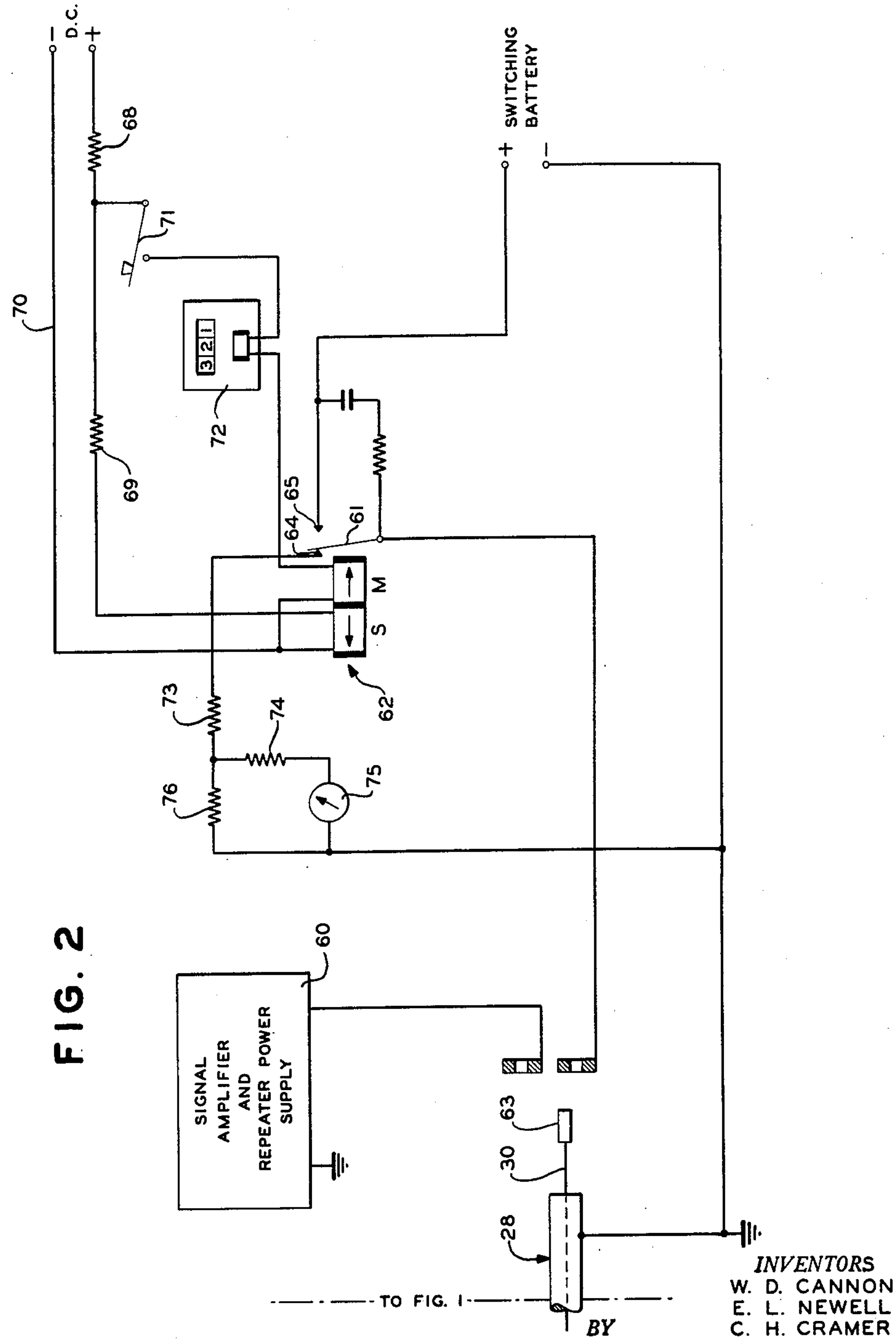

The invention will now be described in greater detail with reference to the appended drawing in which:

Fig. 1 illustrates a repeater switching circuit arrangement in accordance with the invention; and Fig. 2 illustrates control apparatus at a terminal station for use with the circuit arrangement of Fig. 1.

Referring now to the drawing and more particularly to Fig. 1, there is shown a three level rotary switch 20. Levels 21, 22 and 23 of switch 20 each have 10 contacts wiped, respectively, by wipers 24, 25 and 26. The wipers are caused to step one contact at each operation of a D. C. stepping magnet 27. In certain applications it is desirable to cause the wipers to advance one contact for several operations of D. C. stepping magnet 27. While the invention will be described with reference to a one contact advance per stepping magnet operation, it is to be understood that a plurality of stepping magnet operations per contact advance is equivalent thereto.

The switching circuit and associated signal amplifiers A and B are interposed between two submarine cable sections 28 and 29. The repeater of Fig. 1 may conveniently be enclosed within a submersible housing of the type described in the copending patent application of E. L. Newell et al., Serial No. 229,192, filed May 31, 1951, and now abandoned.

Cable section 28 interconnects the repeater and the nearer shore station which is preferably the receiving station. Cable section 29 interconnects the repeater and the farther shore station. Conductor 30 of cable section 28 serves to supply amplifier operating potentials and switching signals to the repeater and to carry the intelligence signals.

As will be described in detail hereinafter, rotary switch 20 provides a plurality of testing and operating conditions in the cable circuit. The wipers of switch 20 are caused to advance each time D. C. stepping magnet 27 is energized. The energizing circuit for stepping magnet 27 extends from cable conductor 30 through the winding of magnet 27, a resistor 31 and the main discharge path of one of a pair of parallel connected cold cathode tubes 32 and 33 to ground on the repeater housing at point 34.

Tubes 32 and 33 are so poled that conduction therethrough is possible solely when conductor 30 is positive with respect to ground. The starter anodes of tubes 32 and 33 are coupled to cable conductor 30 through a series connection of a resistor 35 and a capacitor 36. Resistor 35 serves to limit current in the starter anode circuit and capacitor 36 serves to suppress current flow in the starter anode circuit after breakdown thereby limiting the period of current flow after breakdown. Capacitor 36 also prevents flow of amplifier tube heater currents through the starter anode-cathode circuits of tubes 32 and 33. When a positive voltage is applied to cable conductor 30 at the shore station, the anode potential of tubes 32 and 33 will rise to a value at which the tubes can conduct. This positive voltage also appears at the starter anodes of tubes 32 and 33 in the form of voltage peaks. Whichever one of tubes 32 and 33 has the lowest starter anode breakdown voltage will be rendered conductive, thereby completing the energizing circuit for stepping magnet 27 and stepping the wipers of switch 20. Because the starter anode breakdown voltage of a cold cathode tube tends to increase in service, it is evident that, over a period of time, conduction will be divided between the two tubes, thereby extending the life of the switching circuit without any changes in tube connections.

Only a relatively short positive voltage pulse is needed to operate stepping magnet 27. If it is desired to advance the wipers for more than one step, a train of positive pulses may be employed. Removal of positive voltage from cable conductor 30 at the end of a positive pulse causes deionization of the conductive cold cathode tube.

A cold cathode type tube is peculiarly suited for the switching service described because of its high impedance when non-conductive and the fact that it does not require heater power. With respect to the impedance, it is evident that the tube is shunted across the signaling circuit so that an extremely high impedance is necessary when the tube is nonconductive to prevent an undesirable loss of signal power. Similarly, a high inverse breakdown voltage is necessary because of the possibility of high induced earth potentials in the cable circuit. In a preferred embodiment of the invention, tubes 32 and 33 were realized as type OA4G ionic cathode glow discharge tubes. These tubes exhibited a substantially infinite backwards impedance until an inverse voltage of 200 volts was applied thereto. At voltages in excess of 200 volts and within the possible range of earth potentials, the inverse conduction was not sufficient to operate the stepping magnet or seriously to interfere with the signaling circuit.

Since a repeater of the type contemplated herein may be located many miles from the shore station, it would be inconvenient to supply heater power for the switching circuit tubes. Use of cold cathode type tubes eliminates the necessity for supplying heater power to the switching tubes and permits use of all the heater power available for the amplifier tubes.

For amplifier operation, a negative potential is applied to conductor 30 in place of the positive potential used for switching. While the cable conductor polarities used for switching and signaling could be interchanged, a negative polarity for signaling is desirable to minimize electrolytic erosion of the repeater housing.

Cable conductor 30 is connected to wiper 24 of level 21. Stud 1 of level 21 is connected through a conductor 40 to stud 1 of level 23. Wiper 26 of level 23 is connected to a conductor 41 of cable 29, so that, when the wipers are connected to the respective studs 1 of the three levels, cable conductor 30 is connected through directly to cable conductor 41.

Studs 2, 3 and 5 through 9 of level 21 are interconnected by a conductor 42, while studs 4 and 10 thereof are open. Studs 1, 4 and 10 of level 22 are open, while studs 2, 3 and 9 and 5, 6 and 8 thereof are interconnected, respectively, by conductors 43 and 44. Stud 7 of level 22 is connected to one end of a resistor 45. Studs 4 and 7 through 10 of level 23 are open, while studs 2, 3, 5 and 6 thereof are interconnected by a conductor 46.

Conductor 46 is connected to one end of the primary winding of a signal input transformer 47 through a shaping network 48. The other end of the primary winding of transformer 47 is connected to a remote sea earth through a cable conductor 49. A section of cable 29 adjacent the repeater is realized as a bicore cable 29 so that conductor 49 may be carried for a suitable distance, such as one-quarter mile, before being earthed on the cable armor wires. In this manner feedback which might result from common input and output grounds is avoided.

The secondary winding of transformer 47 is coupled to two parallel connected repeating amplifiers A and B, which may be of any suitable type designed to operate with small power requirements. A suitable amplifier circuit is illustrated in the copending patent application of P. H. Wells et al., Serial No. 229,193, filed May 31, 1951. The center tap of the secondary winding of transformer 47 is connected to wiper 25 and to conductor 42.

The outputs of amplifiers A and B are coupled to the primary of an output transformer 50. One end of the secondary winding of transformer 50 is connected to ground at point 34 while the other end thereof is connected to conductor 42 through a capacitor 51. The secondary winding of transformer 50 is shunted by a resistor 52.

The tube heaters of amplifiers A and B, respectively, are series connected. These heaters are represented in the drawing as HA and HB, respectively. Interconnected studs 2 and 3 of level 22 are coupled to ground through heaters HA, a resistor 53 and resistor 52. Interconnected studs 5 and 6 of level 22 are coupled to ground through heaters HB, resistor 53 and resistor 52. Stud 7 of level 22 is coupled to ground through resistors 45, 53 and 52. The resistance of resistor 45 is chosen substantially equal to the operating resistance values of the tube heaters. Wiper 25 and conductor 42 are interconnected by a conductor 54.

When wipers 24, 25 and 26 are resting on the respective first studs of levels 21, 22 and 23, cable conductors 30 and 41 are directly connected, amplifiers A and B being completely out of the cable circuit. This connection is desired for making certain cable tests, for operating the cable without a repeating amplifier, for operating the cable in the reverse direction when a second repeater is installed near the other end of the cable and for maintaining service in the event of repeater failure.

When wipers 24, 25 and 26 are resting on respective studs 2 or 3 of levels 21, 22 and 23, the cable circuit is completed through amplifier A. The signal circuit extends from cable conductor 41 through wiper 26, conductor 46, shaping network 48, transformer 47, amplifier A, transformer 50, capacitor 51, conductor 42 and wiper 24 to cable conductor 30. The tube heater circuit for amplifier A extends from conductor 30, through wiper 24, conductor 42, conductor 54, wiper 25, heaters HA, resistor 53, rectifier R, and resistor 52 to ground at point 34. Rectifier S serves to prevent switching current from flowing through the heater circuits when the switching circuit is being operated.

When wipers 24, 25 and 26 are resting on respective studs 4 or 10 of levels 21, 22 and 23, the cable circuit, as viewed from either the sending or receiving end, is open and available for desired open cable tests.

When wipers 24, 25 and 26 are resting on respective studs 5 or 6 of levels 21, 22 and 23, the cable circuit is completed through amplifier B. It will be noted that in this connection heaters HB of amplifier B are supplied with current rather than heaters HA of amplifier A.

When wipers 24, 25 and 26 are resting on respective studs 7 of levels 21, 22 and 23, the cable circuit, as viewed from the sending end, is open, while the cable circuit, as viewed from the receiving end, is completed through resistor 45. In this connection, tests may be effected from the receiving end with only a resistance equivalent to a heater circuit terminating the cable.

When wipers 24, 25 and 26 are resting on respective studs 8 or 9 of levels 21, 22 and 23, the cable circuit, as viewed from the sending end, is open, while the cable circuit, as viewed from the receiving end, is completed through heaters HA or HB, respectively. In these connections tests may be made with the amplifier inputs disconnected from the incoming cable section and their heaters operating.

In normal operation of the submarine cable, the cable circuit will be completed through either amplifier A or B. When it is desired to shift from one to the other amplifier or to shift to one of the testing positions described hereinbefore, a number of D. C. stepping pulses equal to the number of studs desired to be stepped is transmitted over cable conductor 30, each stepping pulse energizing stepping magnet 27 and one of tubes 32 and 33 thereby to cause wipers 24, 25 and 26 each to advance one stud.

The testing and operating positions described hereinbefore are given for purposes of illustration only, as other conditions could readily be provided. For instance, a single amplifier with various combinations of replacement tubes could replace amplifiers A and B.

Referring now to Fig. 2, which describes receiving station apparatus for use with the arrangement of Fig. 1, cable conductor 30 may be connected either to a signal amplifier and repeater power supply 60 or to an armature 61 of a polar relay 62 by means of a plug 63. Relay 62 is provided with two windings, S and M. Energization of winding S will cause armature 61 to make a contact 64, while energization of winding M will cause armature 61 to make with contact 65.

Windings S and M are energized from direct current supply terminals DC. The energizing circuit for winding S extends from the positive D. C. terminal through a resistor 68, a resistor 69, winding S, and a conductor 70 to the negative D. C. terminal. The energizing circuit for winding M extends from the positive D. C. terminal through resistor 68, a single pole single throw switch 71, the winding of a counter 72, winding M and conductor 70 to the negative D. C. terminal.

Contact 65 of relay 62 is connected to the positive switching battery terminal, the negative switching battery terminal being connected to the cable ground. Contact 64 of relay 62 is coupled to the cable ground through a resistor 73, a resistor 74 and the winding of an ammeter 75. Resistor 74 and ammeter 75 are shunted by a very small resistor 76.

When it is desired to effect a switching operation at the repeater, plug 63 is inserted in the lower jack so that cable conductor 30 is connected to armature 61. With switch 71 open, only winding S will receive current, so that armature 61 will make with contact 64. Since the value of resistor 76 is very small compared with the series resistance of resistor 74 and meter 75, cable conductor 30 is effectively connected to ground through series connected resistors 73 and 76. This provides a low resistance short time constant circuit for discharging the cable prior to application of switching potential thereto.

When switch 71, which may be termed the pulsing switch, is closed, winding M is energized, causing armature 61 to make with contact 65, thereby applying switching potential from the switching battery to the cable. This potential energizes one of tubes 32 and 33 at the repeater and causes magnet 27 to step switch 20 one contact. It is to be understood, of course, that the circuit may be arranged so that this operation must be repeated a number of times before switch 20 steps a full contact. When switch 71 is released, armature 61 breaks with contact 65 and makes with contact 64. This latter operation again connects the discharging circuit to the cable conductor so that the cable may rapidly be discharged. The time required for discharge depends on the time constant of the distributed capacity of the cable and resistors 73 and 76. This time constant should be made sufficiently small that switch 71 may be manually reclosed a very short time after it is opened. In this manner successive switching pulses may be transmitted without undue delay.

It will be noted that winding S is not disconnected when winding M is energized by closing of switch 71. However, when winding M is energized, the voltage drop across resistor 69 reduces the current through winding S to a value lower than that through winding M.

Each time switch 71 is closed, current flows through the winding of counter 72, causing the indicator to advance one digit. In this manner, a record is kept of the number of pulses transmitted and hence of the position of switch 20 at the repeater.

A part of the discharging current of the cable circuit flows through meter 75. From the meter reading the position of switch 20 at the repeater may be determined. That this is true may be seen from the fact that the different repeater switching positions will provide different cable terminations and hence a different cable discharge characteristic While the invention has been described in a specific embodiment thereof and in a specific use, it is not desired that it be limited thereto, for obvious modifications thereof will occur to those skilled in the art without departing from the spirit and scope of the invention as set forth in the appended claims.

What is claimed is:

1. A submersible repeater for incorporation in a submarine cable circuit, comprising an electronic amplifier, switching means associated therewith, said switching means having a plurality of switching positions for selectively providing a plurality of testing, operating and amplifying conditions in said cable circuit, positioning means responsive to positioning pulses received over said cable circuit for operating said switching means from one to another of said switching positions thereof, and a normally open energizing circuit for said positioning means, said energizing circuit including a cold cathode tube coupled to said cable circuit and to said positioning means and arranged to close said energizing circuit in response to said received positioning pulses.

2. A submersible repeater for incorporation in a submarine cable circuit, comprising an electronic amplifier, switching means associated therewith, said switching means having a plurality of switching positions for selectively providing a plurality of testing, operating and amplifying conditions in said cable circuit, stepping means responsive to direct current stepping pulses received over said cable circuit for operating said switching means from one to another of said switching positions thereof, and a normally open energizing circuit for said stepping means, said energizing circuit including a normally inactive electronic device coupled to said cable circuit and to said stepping means whereby said energizing circuit is closed in response to said received stepping pulses.

3. A submersible repeater for incorporation in a simplex submarine cable circuit having an outgoing cable section and an incoming cable section connected, respectively, to a receiving terminal and a sending terminal, comprising an electronic amplifier, switching means associated therewith, said switching means having a plurality of switching positions for selectively providing a plurality of testing, operating and amplifying conditions in said cable circuit, a stepping magnet responsive to direct current stepping pulses received over said outgoing cable section for operating said switching means from one to another of said switching positions thereof, and a normally open energizing circuit for said stepping magnet, said energizing circuit including a cold cathode tube coupled to said outgoing cable section and to said stepping magnet and arranged to close said energizing circuit in response to said received direct current stepping pulses, said cold cathode tube being poled so as to provide a substantially infinite impedance to intelligence signals received over said incoming cable section.

4. A submersible repeater for incorporation in a submarine cable circuit, comprising a plurality of electronic amplifiers each having an input circuit, an output circuit and a tube heater circuit, switching means associated therewith, said switching means having a plurality of switching positions for selectively operatively connecting said electronic amplifiers in said cable circuit and for selectively providing a plurality of testing and operating conditions in said cable circuit, stepping means responsive to stepping pulses received over said cable circuit for operating said switching means from one to another of said switching positions thereof, and a normally open energizing circuit for said positioning means, said energizing circuit including a cold cathode tube coupled to said cable circuit and arranged to close said energizing circuit in response to said received stepping pulses, said cold cathode tube being poled so as to provide a substantially infinite impedance with respect to intelligence signals and with respect to direct current supplied over said cable circuit for said tube heater circuits.

5. A submersible repeater for incorporation in a submarine cable circuit, comprising an electronic amplifier, switching means associated therewith, said switching means having a plurality of switching positions for selectively providing a plurality of testing, operating and amplifying conditions in said cable circuit, stepping means responsive to direct current stepping pulses received over said cable circuit for operating said switching means from one to another of said switching positions thereof, and a normally open energizing circuit for said stepping means, said energizing circuit including a plurality of parallel connected cold cathode tubes coupled to said cable circuit and arranged to close said energizing circuit in response to said received stepping pulses.

6. A submersible repeater for incorporation in a submarine cable circuit including a cable conductor and an earth return path, comprising an electronic amplifier, switching means associated therewith, said switching means having a plurality of switching positions for selectively providing a plurality of testing, operating and amplifying conditions in said cable circuit, a direct current stepping magnet having an operating winding and being arranged to operate said switching means from one to another of said switching positions thereof in response to received direct current stepping pulses, means intercoupling one end of said winding and said cable conductor, a cold cathode tube having an anode, a cathode and a starter anode, means intercoupling said anode and the other end of said winding, means intercoupling said cathode and said earth return path, and means intercoupling said starter anode and said cable conductor whereby said cold cathode tube is rendered conductive when a direct current stepping pulse is received over said cable circuit.

7. A submersible repeater for incorporation in a simplex submarine cable circuit having an outgoing cable section and an incoming cable section connected, respectively, to a receiving terminal and a sending terminal, each of said cable sections including a cable conductor and an earth return path, comprising an electronic amplifier adapted to operate on a given polarity unidirectional current supplied over said outgoing cable section, switching means associated therewith, said switching means having a plurality of switching positions for selectively providing a plurality of testing, operating and amplifying conditions in said cable circuit, a stepping magnet having an operating winding and being arranged to operate said switching means from one to another of said switching positions thereof in response to unidirectional current stepping pulses having a polarity opposite said given polarity and received over said outgoing cable section, means intercoupling one end of said winding and the cable conductor of said outgoing cable section, a cold cathode tube having an anode, a cathode and a starter anode, means intercoupling said anode and the other end of said winding, means intercoupling said cathode and the earth return path of said outgoing cable section, and means intercoupling said starter anode and the cable conductor of said outgoing cable section whereby said cold cathode tube is rendered conductive when a unidirectional current stepping pulse having a polarity opposite said given polarity is received over said outgoing cable section.

8. A submersible repeater for incorporation in a submarine cable circuit including a cable conductor and an earth return path, comprising an electronic amplifier, switching means associated therewith, said switching means having a plurality of switching positions for selectively providing a plurality of testing, operating and amplifying conditions in said cable circuit, a direct current stepping magnet having an operating winding and being arranged to operate said switching means from one to another of said switching positions thereof in response to received direct current stepping pulses, means intercoupling one end of said winding and said cable conductor, a plurality of parallel connected cold cathode tubes each having an anode, a cathode and a starter anode, means intercoupling said anodes and the other end of said winding, means intercoupling said cathodes and said earth return path, and means including a capacitive element intercoupling said starter anodes and said cable conductor whereby one of said cold cathode tubes is rendered conductive when a direct current stepping pulse is received over said cable circuit.

9. A submarine cable circuit, comprising a submersible repeater interposed in a submerged portion of said cable circuit and including switching means, said switching means having a plurality of switching positions for selectively providing a plurality of testing and operating conditions in said cable circuit, stepping means responsive to direct current stepping pulses received over said cable circuit for operating said switching means from one to another of said switching positions thereof and a normally open energizing circuit for said stepping means, said energizing circuit including a cold cathode tube coupled to said cable circuit and arranged to close said energizing circuit in response to said received stepping pulses, and a shore station comprising intelligence signaling apparatus, control signaling apparatus and means for connecting either said intelligence signaling apparatus or said control signaling apparatus into said cable circuit, said control signaling apparatus comprising means for selectively applying said direct current stepping pulses to said cable circuit.

10. A submarine cable circuit, comprising a submersible repeater interposed in a submerged portion of said cable circuit and including switching means, said switching means having a plurality of switching positions for selectively providing a plurality of testing and operating conditions in said cable circuit, stepping means responsive to direct current stepping pulses received over said cable circuit for operating said switching means from one to another of said switching positions thereof and a normally open energizing circuit for said stepping means, said energizing circuit including a cold cathode tube coupled to said cable circuit and arranged to close said energizing circuit in response to said received stepping pulses, and a shore station comprising intelligence signaling apparatus, control signaling apparatus and means for connecting either said intelligence signaling apparatus or said control signaling apparatus into said cable circuit, said control signaling apparatus comprising means for alternately selectively applying said direct current stepping pulses to said cable circuit and for discharging said cable circuit.

11. A submarine cable circuit, comprising a submersible repeater interposed in a submerged portion of said cable circuit and including switching means, said switching means having a plurality of switching positions for selectively providing a plurality of testing and operating conditions in said cable circuit, stepping means responsive to direct current stepping pulses received over said cable circuit for operating said switching means from one to another of said switching positions thereof and a normally open energizing circuit for said stepping means, said energizing circuit including a cold cathode tube coupled to said cable circuit and arranged to close said energizing circuit in response to said received stepping pulses, a transmitting station coupled to one end of said cable circuit for transmitting intelligence signals thereover and a receiving station comprising intelligence signaling apparatus for receiving said intelligence signals and for supplying operating power to said repeater, control signaling apparatus and means for connecting either said intelligence signaling apparatus or said control signaling apparatus into said cable circuit, said control signaling apparatus comprising circuit means for selectively applying said direct current stepping pulses to said cable circuit, a short time constant discharging circuit for said cable circuit and means for alternately connecting either said circuit means or said discharging circuit to said cable circuit.

12. A submersible repeater for incorporation in a submarine cable circuit, having a cable conductor and an earth return path, comprising an electronic amplifier having a tube heater circuit including a unidirectional conductor for permitting the flow of heating current having a given polarity, switching means associated therewith, said switching means having a plurality of switching positions for selectively providing a plurality of testing, operating and amplifying conditions in said cable circuits, a direct current stepping magnet having an operating winding and being arranged to operate said switching means from one to another of said switching positions thereof in response to received direct current stepping pulses, means intercoupling one end of said winding and said cable conductor, a cold cathode tube having an anode, a cathode and a starter anode, means intercoupling said anode and the other end of said winding, means intercoupling said cathode and said earth return path, and means intercoupling said starter anode and said cable conductor whereby said cold cathode tube is rendered conductive when a direct current stepping pulse having a polarity opposite said given polarity is received over said cable circuit.

13. A submersible repeater for incorporation in a submarine cable circuit, having a cable conductor and an earth return path, comprising a plurality of electronic amplifiers each having a tube heater circuit, a rectifier element included in said tube heater circuits for permitting the flow therethrough of heater current having a given polarity, switching means, said switching means having a plurality of switching positions for selectively operatively connecting said electronic amplifiers in said cable circuit and for selectively providing a plurality of testing and operating conditions in said cable circuit, a direct current stepping magnet having an operating winding and being arranged to operate said switching means from one to another of said switching positions thereof in response to received direct current stepping pulses, means intercoupling one end of said winding and said cable conductor, a cold cathode tube having an anode, a cathode and a starter anode, means intercoupling said anode and the other end of said winding, means intercoupling said cathode and said earth return path, and means intercoupling said starter anode and said cable conductor whereby said cold cathode tube is rendered conductive when a direct current stepping pulse having a polarity opposite said given polarity is received over said cable circuit.

14. A submersible repeater for incorporation in a submarine cable circuit, comprising an electronic amplifier having a tube heater circuit including a rectifier element arranged to permit the flow of heater current having a given polarity, switching means associated therewith, said switching means having a plurality of switching positions for selectively providing a plurality of testing, operating and amplifying conditions in said cable circuit, stepping means responsive to direct current stepping pulses received over said cable circuit and having a polarity opposite said given polarity for operating said switching means from one to another of said switching positions thereof, a normally open energizing circuit for said stepping means, said energizing circuit including a cold cathode tube coupled to said cable circuit, said cold cathode tube having a starter anode circuit including a capacitive element and coupled to said cable circuit whereby said cold cathode tube is rendered conductive and said energizing circuit is closed in response to said received direct current stepping pulses having a polarity opposite said given polarity.

References Cited in the file of this patent

UNITED STATES PATENTS

| Number | Name | Date |
|---|---|---|
| 1,901,185 | Nelson ----------- | Mar. 14, 1933 |
| 2,020,318 | Jacobs ----------- | Nov. 12, 1935 |